US008711973B2

(12) United States Patent
Wang et al.

(10) Patent No.: US 8,711,973 B2
(45) Date of Patent: *Apr. 29, 2014

(54) HIGHLY DETECTABLE PILOT STRUCTURE

(71) Applicant: QUALCOMM Incorporated, San Diego, CA (US)

(72) Inventors: Michael M. Wang, San Diego, CA (US); Ravi Palanki, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,651

(22) Filed: Mar. 4, 2013

(65) Prior Publication Data

US 2013/0182784 A1 Jul. 18, 2013

Related U.S. Application Data

(62) Division of application No. 12/564,801, filed on Sep. 22, 2009, now Pat. No. 8,391,401.

(60) Provisional application No. 61/099,383, filed on Sep. 23, 2008.

(51) Int. Cl.
*H04L 27/00* (2006.01)
(52) U.S. Cl.
USPC .......................................................... 375/295
(58) Field of Classification Search
USPC ................. 375/295, 130, 146, 147, 258, 316;
370/328, 329; 455/39
See application file for complete search history.

(56) References Cited

U.S. PATENT DOCUMENTS

| 6,904,078 | B1 | 6/2005 | Abeta et al. |
| 7,796,706 | B2 | 9/2010 | Vare et al. |
| 7,893,873 | B2 | 2/2011 | Black et al. |
| 8,045,628 | B2 | 10/2011 | Lahtonen et al. |
| 8,391,401 | B2 | 3/2013 | Wang et al. |
| 8,514,988 | B2 * | 8/2013 | Wu et al. ........................ 375/345 |
| 2007/0153743 | A1 | 7/2007 | Mukkavilli et al. |
| 2009/0116374 | A1 | 5/2009 | Henriksson et al. |
| 2009/0310552 | A1 | 12/2009 | Wang et al. |
| 2013/0176946 | A1 * | 7/2013 | Wang et al. .................... 370/328 |
| 2013/0176947 | A1 | 7/2013 | Wang et al. |
| 2013/0182667 | A1 | 7/2013 | Wang et al. |

FOREIGN PATENT DOCUMENTS

| CN | 1980212 A | 6/2007 |
| WO | 2007120326 A2 | 10/2007 |

OTHER PUBLICATIONS

International Search Report and Written Opinion—PCT/US2009/058105—ISA/EPO—Feb. 10, 2010.

(Continued)

*Primary Examiner* — Khai Tran
(74) *Attorney, Agent, or Firm* — Anthony R. Morris

(57) ABSTRACT

Aspects describe a Highly Detectable Pilot that allows a mobile device to detect more base stations and, thus, can provide more accuracy in location estimate. A highly detectable pilot can be transmitted in one or more data symbols that are not currently being utilized for transmission of data. Transmission of the highly detectable pilot in two data symbols provide a receiver with more convergence time, however, it can take the receiver a longer amount of time to acquire an adequate number of pilots for a location estimate.

40 Claims, 13 Drawing Sheets

(56) References Cited

OTHER PUBLICATIONS

Motorola: "On Serving Cell Muting for OTDOA Measurements" 3GPP Draft; R1-092628, 3rd Generation Partnership Project (3GPP), Mobile Competence Centre ; 650, Route Des Lucioles ; F-06921 Sophia-Antipolis Cedex France, no. Los Angeles, USA; 20090624, Jun. 24, 2009, XP050351121 [retrieved on Jun. 24, 2009].

Wu Q, et al., "CDMA2000 Highly Detectable Pilot" Communications Workshops, 2008. ICC Workshops 08. IEEE International Conference on, IEEE, Piscataway, Nj, USA, May 19, 2008, pp. 16-20, XP031265196 ISBN: 978-1-4244-2052-0 p. 1, Left-Hand Column, Line 8-p. 1, Right-Hand Column, Line 31.

* cited by examiner

HIGHLY DETECTABLE PILOT STRUCTURE

CROSS-REFERENCE

This is a divisional application of U.S. patent application Ser. No. 12/564,801 entitled HIGHLY DETECTABLE PILOT STRUCTURE filed Sep. 22, 2009, which claims priority to U.S. Provisional Patent Application No. 61/099,383 entitled HIGHLY DETECTABLE PILOT STRUCTURE filed Sep. 23, 2008, each assigned to the assignee hereof, and each of which is hereby expressly incorporated by reference herein.

BACKGROUND

I. Field

The following description relates generally to wireless communications and more particularly to highly detectable pilot structures for location detection in a wireless network.

II. Background

Wireless communication systems are widely deployed to provide various types of communication and to communicate information regardless of where a user is located (e.g., inside or outside a structure) and regardless of whether a user is stationary or moving (e.g., in a vehicle, walking). For example, voice, data, video, and so forth can be provided through wireless communication systems. A typical wireless communication system, or network, can provide multiple users access to one or more shared resources. A system can use a variety of multiple access techniques such as Frequency Division Multiplexing (FDM), Time Division Multiplexing (TDM), Code Division Multiplexing (CDM), Orthogonal Frequency Division Multiplexing (OFDM), 3GPP Long Term Evolution (LTE), and others.

Mobile positioning techniques are utilized for many location based services, such as emergency services, advertising, and so forth. Mobile location can be estimated based on measurements from satellites and terrestrial base stations. Satellite measurements can be utilized in rural and suburban areas. However, satellite measurements might be less available (or not available at all) in dense urban and indoor areas. Thus, base station measurements can be utilized more often for mobile positioning in areas where satellite measurements are not readily available and base station measurements have an important role in mobile positioning.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing the opportunity for a mobile device to detect as many base stations as possible, which can provide a better accuracy in location estimate.

Certain aspects of the present disclosure provide a method that conveys a highly detectable pilot in a wireless communication network. The method generally includes identifying a position of at least one data symbol for transmission of the highly detectable pilot, and conveying the highly detectable pilot in the position of the at least one data symbol, wherein the highly detectable pilot is conveyed to one or more receivers for a determination of the position, and wherein a low reuse factor is utilized for transmission of the highly detectable pilot.

Certain aspects of the present disclosure provide an apparatus that conveys a highly detectable pilot in a wireless communication network. The apparatus generally includes at least one processor and a memory coupled to the at least one processor. The at least one processor is generally configured to identify a position of at least one data symbol for transmission of the highly detectable pilot, and convey the highly detectable pilot in the position of the at least one data symbol, wherein the highly detectable pilot is conveyed to one or more receivers for a determination of the position, and wherein a low reuse factor is utilized for transmission of the highly detectable pilot.

Certain aspects of the present disclosure provide an apparatus that conveys a highly detectable pilot in a wireless communication network. The apparatus generally includes means for identifying a position of at least one data symbol for transmission of the highly detectable pilot, and means for conveying the highly detectable pilot in the position of the at least one data symbol, wherein the highly detectable pilot is conveyed to one or more receivers for a determination of the position and wherein a low reuse factor is utilized for transmission of the highly detectable pilot.

Certain aspects of the present disclosure provide a computer-readable medium that conveys a highly detectable pilot in a wireless communication network, generally comprising code for identifying a position of at least one data symbol for transmission of the highly detectable pilot, and code for conveying the highly detectable pilot in the position of the at least one data symbol, wherein the highly detectable pilot is conveyed to one or more receivers for a determination of the position, and wherein a low reuse factor is utilized for transmission of the highly detectable pilot.

Certain aspects of the present disclosure provide a method for receiving a highly detectable pilot in a wireless communication network. The method generally includes receiving symbols from one or more transmitters, and determining a position of at least one data symbol in which the highly detectable pilot was transmitted, wherein a low reuse factor was utilized for transmission of the highly detectable pilot.

Certain aspects of the present disclosure provide an apparatus for receiving a highly detectable pilot in a wireless communication network. The apparatus generally includes at least one processor and a memory coupled to the at least one processor. The at least one processor is generally configured to receive symbols from one or more transmitters, and determine a position of at least one data symbol in which a highly detectable pilot was transmitted, wherein a low reuse factor was utilized for transmission of the highly detectable pilot.

Certain aspects of the present disclosure provide an apparatus for receiving a highly detectable pilot in a wireless communication network. The apparatus generally includes means for receiving symbols from one or more transmitters, and means for determining a position of the at least one data symbol in which a highly detectable pilot was transmitted, wherein a low reuse factor was utilized for transmission of the highly detectable pilot.

Certain aspects of the present disclosure provide a computer-readable medium for receiving a highly detectable pilot in a wireless communication network, comprising code for code for receiving symbols from one or more transmitters, and code for determining a position of the at least one data symbol in which a highly detectable pilot was transmitted, wherein a low reuse factor was utilized for transmission of the highly detectable pilot.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
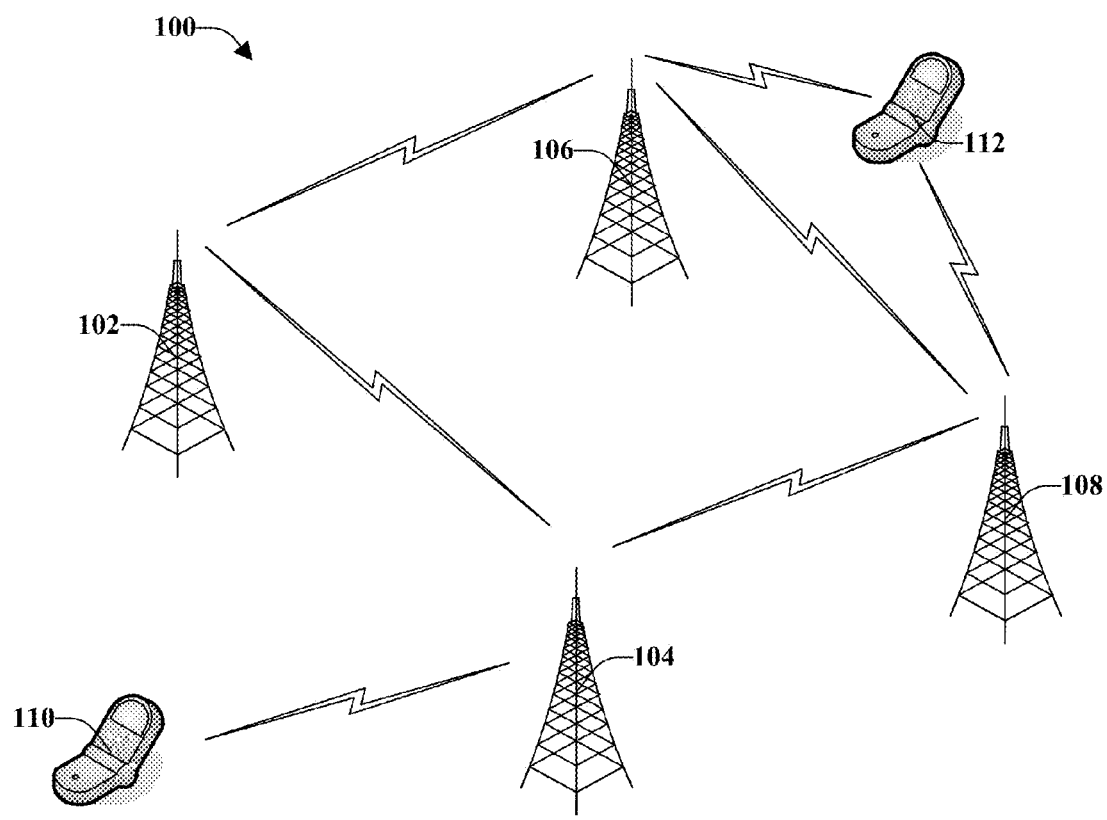
FIG. 1 illustrates a wireless communication system in which the disclosed aspects can be utilized.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

With reference to FIG. 1, illustrated is a wireless communication system 100 in which the disclosed aspects can be utilized. Illustrated are transmitters 102, 104, 106, 108 and receivers 110, 112. It should be noted that any number of transmitters and receivers can be included in wireless communication system 100 and that the number of each illustrated is for explanation purposes. Transmitters 102, 104, 106, 108 can be base stations and receivers 110, 112 can be mobile devices, wherein a multitude of base stations and mobile devices are utilized in wireless communication system 100.

At times, it might be difficult for a receiver to detect a pilot from a transmitter. For example, as illustrated, receiver 110 is in close proximity to transmitter 104, which can be a serving base station. In this case, transmitter 104 can emit a dominate signal, which renders it difficult for receiver 110 to detect weaker pilot signals, such as signals from transmitters 102, 106, 108. The situation described is referred to as a "near-far effect" and limits the ability of receiver to detect many transmitters. For example, a wireless communication system 100 can include a large number of base stations (e.g., transmitters), however, a receiver might only be able to detect pilots from two or three base stations. These two or three received pilots do not provide adequate information to correct measurement errors or to provide other advantages associated with location detection. However, though utilization of the disclosed aspects, receivers can detect pilots from a larger number of transmitters, even in the case where there is a dominant signal from one transmitter and the near-far effect is a concern.

In accordance with some aspects, wireless communication system 100 can be configured to utilize a highly detectable pilot structure wherein one OFDM symbol is utilized, which can provide a shorter time to fix (or time to determine a mobile device position). According to some aspects, wireless communication system 100 can be configured to utilize a highly detectable pilot structure where two OFDM symbols are utilized. A receiver (e.g., mobile device) attempting to decode a highly detectable pilot structure across two OFDM symbols can utilize the additional amount of time to acquire the respective highly detectable pilot from a multitude of transmitters. Further information related to these highly detectable pilot structures will be provided below.

Figure 2:
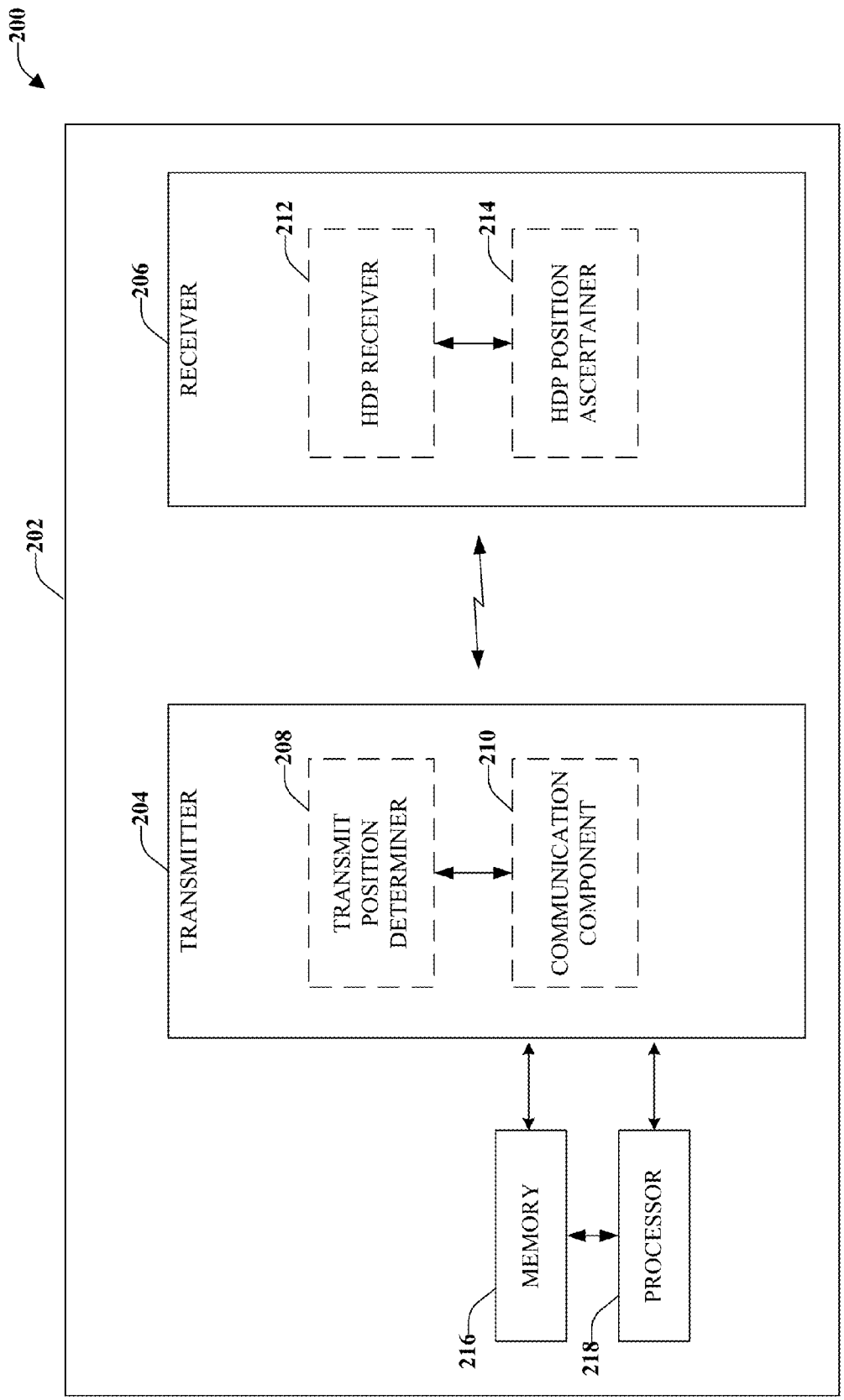
FIG. 2 illustrates a system for detection of mobile positioning in accordance with the one or more aspects disclosed herein.

FIG. 2 illustrates a system 200 for detection of mobile positioning in accordance with the one or more aspects disclosed herein. System 200 can be utilized in a wireless communication network 202, which can be any type of communication network, such as a cellular network, which can be an LTE system. Included in wireless communication network 202 is a transmitter 204 that communications with a receiver 206. It should be understood that although any number of transmitter(s) 204 and receiver(s) 206 can be included in wireless communication network 202, as will be appreciated, a single transmitter 204 that transmits communication data signals to a single receiver 206 is illustrated for purposes of simplicity.

System 200 can be configured to utilize a highly detectable pilot (HDP) for detection of neighboring base stations. As utilized herein a highly detectable pilot might also be referred to as a low reuse pilot, a positioning assistance reference signal (PA-RS), or a low reuse preamble. HDPs can enable detection of a multitude of transmitters by receivers. For example, one or more receivers, such as mobile devices, can be configured to detect HDPs sent from a multitude of transmitters (e.g., base stations). Since wireless communication network 202 is aware of the location of each transmitter 204, a receiver 206 that reports its relative position/distance with respect to each transmitter 204 allows wireless communication network 202 to ascertain an approximate location of receiver 206. Thus, it is advantageous for receiver 206 to detect HDPs from as many transmitters as possible for efficiency purposes (e.g., to correct measurement errors, to average out any errors, and so forth). Further, determining a location of receiver 206, wherein the location is as accurate as possible, can be utilized for location based services (e.g., emergency calls, advertising, and other location based communications).

Further, the HDP structures disclosed herein and utilized in wireless communication network 202 can allow receivers to detect transmitters that have a weak signal due to the distance between transmitter and receiver and other factors, including a near-far effect. For example, a serving base station (e.g., transmitter) can have a strong signal that makes detection of signals from neighboring base stations difficult. The utilization of the HDP structures disclosed herein provides for the detection of HDPs from transmitters that are farther away from receiver and/or that have a weak signal, which can enhance mobile positioning though base station (e.g., transmitter) measurements.

The various aspects disclosed herein provide a signal that can be easier for a mobile device (e.g., receiver 206) to detect through the utilization of highly detectable pilot or HDP). With multiplexing, a number of slots (n slots) are available in a subframe and a transmitter 204 (e.g., base station) chooses one of the n slots during which to transmit a HDP. Each transmitter 204 is authorized to utilize only one slot from the n slots to transmit the HDP in accordance with an aspect. During the other, non-selected n slots, the transmitter 204 is silent (e.g., does not transmit). An advantage of this aspect is that, if a receiver 206 is close to a transmitter 204 that is emitting a very strong signal, since that transmitter 204 is only transmitting during one n slot, the receiver 206 can detect other transmitters (e.g., weaker base stations) during the silence period of the dominant transmitter.

In accordance with some aspects, the transmitter 204 can determine which position or slot of the n slots during which to transmit utilizing network planning and/or random selection. According to some aspects, the following equation can be utilized by a transmit position determiner 208 to decide the transmit position:

$$\text{HDP Cluster} = \text{Hash}(\text{CellGroupID} + \text{ClusterID}) \bmod M$$

where the Cluster is a group of HDP subframes or bursts. The CellGroup ID is an identification of the base station or transmitter (which is known by the mobile device or receiver). The Cluster ID is the HDP cluster. Further, the hash can be predetermined and is known by both the transmitter and receiver. In accordance with some aspects, the hash can be random, provided both transmitter and receiver are aware of the hash function utilized. The HDP pilot is transmitted to a multitude of receivers 206 by a communication component 210.

Receiver 206 can include a HDP receiver 212 that is configured to receive HDPs transmitting by a number of transmitters 204. Receiver 206 can also include an HDP position ascertainer 214 that is configured to determine a transmit location of the HDP (e.g., one OFDM symbol or two OFDM symbols).

For example, HDP position ascertainer 214 can utilize an equation similar to an equation utilized by transmit position determiner 208 associated with transmitter 204. For example, receiver 206 can utilize the equation: HDP Cluster=Hash (CellGroupID+ClusterID)modM. A Cluster refers to a group of HDP subframes or bursts. For example, if there are twenty-one HDP symbols, then multiple subframes are needed to transmit those HDP pilots. Thus if there are twenty-one HDP symbols, there are three subframes in an example. The Cell-Group ID is an identification of a base station or transmitter 204, wherein each transmitter 204 had a different identification. Thus, the position of the HDP is determined as a function of a CellGroup ID and a ClusterID (HDP cluster that includes a number of HDP pilots, referred to as a cluster). Utilization of the equation mitigates needing a network (e.g., network planning).

Further, HDP position ascertainer 214 (e.g., receiver 206) can determine which base station or transmitter 204 should be detected on each OFDM symbol. Thus, receiver 206 will not blindly detect all transmitters 204, but only the transmitters 204 that are to transmit on that OFDM symbol(s). If a network plan were utilized, receiver 206 would not know how many base stations (or transmitters 204) are transmitting on the symbol (varies from network to network) and receiver 206 has to detect all the possibilities (e.g., all 512 base stations).

This process requires receiver 206 to spend a much longer time, consumes more battery power and excessive resources and can cause false alarms. Thus, HDP position ascertainer 214 can save power, system resources, and mitigate false alarms through utilization of the disclosed aspects.

System 200 can include memory 216 operatively coupled to transmitter 204. Memory 216 can be external to transmitter 204 or can reside within transmitter 204. Memory 216 can store information related to identifying a portion of at least one symbol in which to transmit a highly detectable pilot and sending, to one or more receivers in a wireless network, the highly detectable pilot in the portion of the at least one symbol.

In accordance with some aspects, the instructions related to identifying the portion of the at least one symbol chooses from a set of n slots and the memory retains further instructions related to not transmitting during the n slots that are not chosen. According to other aspects, the instructions related to identifying the portion of the at least one symbol utilizes a cell group identification to ascertain the portion of the at least one symbol. In some aspects, instructions related to identifying the portion of the at least one symbol chooses the at least one symbol randomly. Additionally or alternatively, memory 216 retains further instructions related to receiving information from the wireless network, wherein the instructions provide an identification of the at least one symbol.

In accordance with some aspects, memory 216 retains further instructions related to combining the at least one symbol and a second symbol to create a combination of two symbols and transmitting the highly detectable pilot in the portion of the combination of two symbols. Memory 216 can also retain other suitable information related to signals transmitted and received in a communication network.

Memory 216 can store protocols associated with highly detectable pilots, taking action to control communication between transmitter 204 and receiver 206, and so forth, such that system 200 can employ stored protocols and/or algorithms to achieve improved communications in a wireless network as described herein. In accordance with some aspects, a memory and a processor can be operatively coupled to receiver 206.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

At least one processor 218 can be operatively connected to transmitter 204 (and/or memory 216) to facilitate analysis of information related to transmitting highly detectable pilots in a communication network. Processor 218 can be a processor dedicated to analyzing and/or generating information received by transmitter 204, a processor that controls one or more components of system 200, and/or a processor that both analyzes and generates information received by transmitter 204 and controls one or more components of system 200.

In accordance with some aspects, processor 218 is configured to transmit highly detectable pilots for mobile device location determination. Processor 218 can include a first module for selecting a position in at least one data symbol. Processor 218 can also include a second module for conveying a highly detectable pilot during the position and remaining silent during other positions of the at least one data symbol. Remaining silent allows a receiver to detect pilots sent from other transmitters. In accordance with some aspects, processor 218 includes a third module for combining the at least one data symbol and a second data symbol to create a combination, wherein first module selects the position in the combination and second module conveys the highly detectable pilot in the position in the combination.

Figure 3:
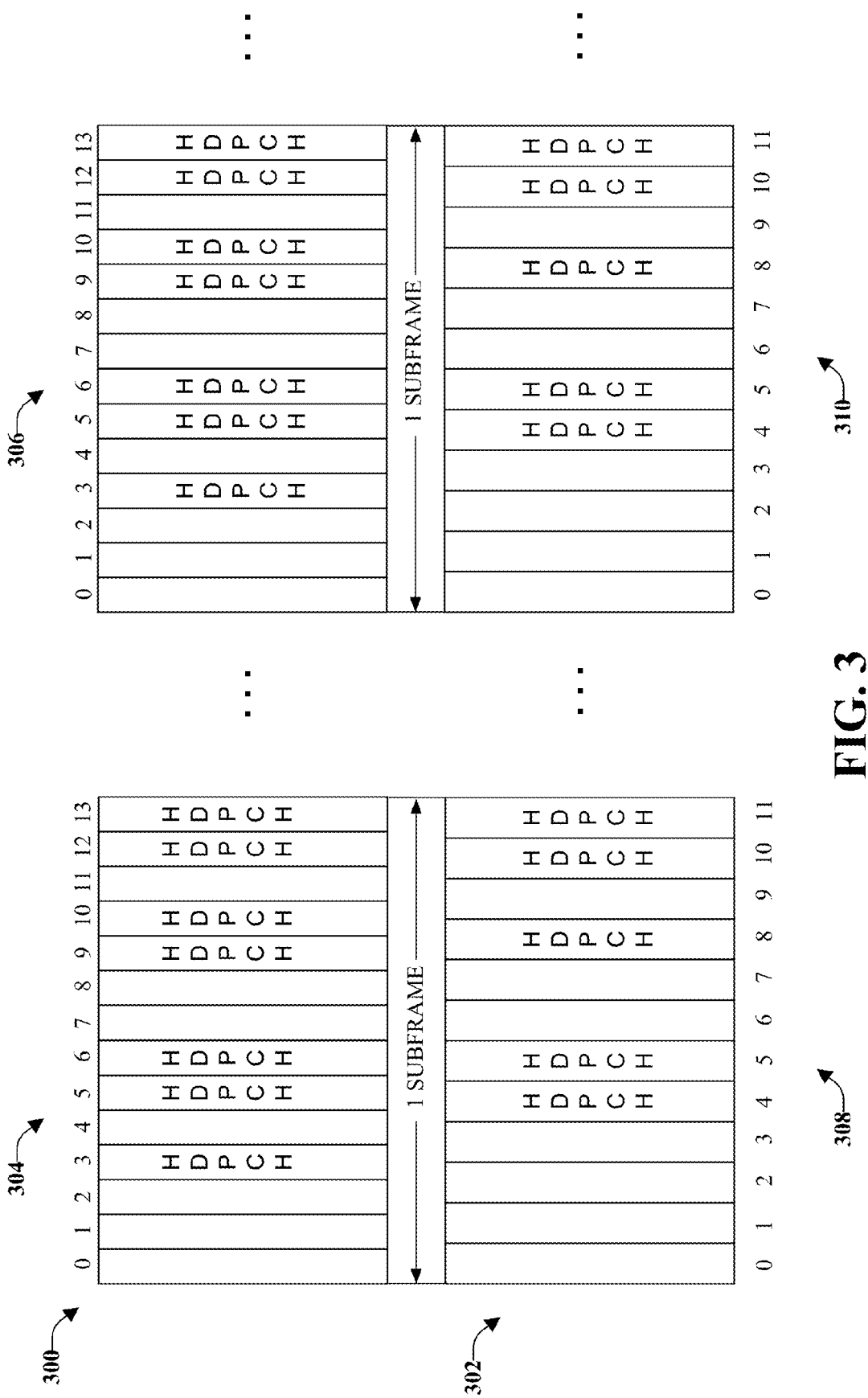
FIG. 3 illustrates a Highly Detectable Pilot structure for an LTE Platform in accordance with an aspect.

FIG. 3 illustrates an HDP structure for an LTE Platform in accordance with an aspect. Illustrated at 300 is an HDP Structure for a LTE Frame Type 0 and at 302 is an HDP Structure for a LTE Frame Type 1. Illustrated are two subframes 304, 306 for Frame Type 0 (300), each subframe 304, 306 includes fourteen OFDM symbols (labeled 0 through 13). Also illustrated are two subframes 308 and 310 for Frame Type 1 (304), each subframe 308, 310 includes twelve OFDM symbols (labeled 0 through 11). It should be understood that although only two subframes for each Frame Type 300, 302 are illustrated for purposes of simplicity, a multitude of subframes can be utilized with the disclosed aspects.

Only a subset of the available OFDM symbols are utilized for the HDPs, which are labeled HDPCH (Highly Detectable Pilot Channel). For example, the symbols that are available for HDP in subframes 304 and 306 are symbols 3, 5, 6, 9, 10, 12, and 13. In another example, the symbols available in subframe 308 and 310 are symbols 4, 5, 8, 10, and 11. The other symbols (e.g., symbols 0, 1, 2, and so forth) can be reserved for other purposes (e.g., pilots, control signals, and so forth). It should be noted that the position of the symbols in the illustrated subframes are for example purposes only and can be changed depending on the network, system, and other considerations.

The symbols that can be utilized for the HDPCH can be data symbols and, since some of these symbols need to be utilized for data, all of the symbols available for HDPCH might not be utilized. Thus, the HDP can be transmitted utilizing low overhead, wherein a symbol might be utilized for HDP in a first subframe and not utilized in a next (or any number of subframes). Thus, HDPs are not continuously transmitted every subframe, just every once in a while and, therefore, the overall impact to the system is kept minimal.

By way of example and not limitation, a serving base station has chosen to transmit its HDP in OFDM symbol 5. The serving base station is silent (does not transmit its HDP) in the remaining OFDM symbols that are available for HDP transmission by other base stations. In such a manner, the receiving mobile device is provided the opportunity to detect HDPs received from base stations whose received signal is weaker than the signal received from the serving base station.

In accordance with some aspects, there can be more base stations than there are available slots. In the illustrated example, Frame Type 0 (300) has seven HDP transmit opportunities/OFDM symbols (e.g., symbols 3, 5, 6, 9, 10, 12 and 13) per HDP Burst (minimum subcarrier can equal 72). Frame Type 1 (302) has five HDP transmit opportunities/OFDM symbols (e.g., symbols 4, 5, 8, 10, and 11) per HDP Burst (minimum subcarrier can equal 72). For Frame Type 0 (300) the collision is reduced by a factor of seven and the collision opportunity is reduced by a factor of five for Frame Type 1 (302). Thus, the more HDP opportunities (OFDM symbols) that are available the less the collision possibilities.

According to some aspects, a HDP Cluster can contain multiple HDP burst to obtain a multiplexing factor (M>7, 5). Thus, more OFDM symbols can be utilized over a multiple subframes. A tradeoff of this aspect is that more resources are utilized for HDPCHs that are spread further apart in time. For example, for two subframes having fourteen OFDM symbols each, two subframes can be utilized, which will take longer than utilizing only one subframe. Thus, the "time to fix" or detect HDPCH from all base stations is longer. Continuing the example, if fourteen OFDM symbols are chosen for one transmission, a base station is only permitted to transmit on one OFDM symbol in a total of fourteen HDP channels. In another example, if twenty one OFDM symbols comprise the HDP Cluster, the "time to fix" is three times longer (e.g., three subframes) than if only one subframe (seven HDP/OFDM symbols) are utilized. For example, if M is equal to fifteen, three HDP busts equals one HDP Cluster (e.g., an HDP Cluster of M=15 has three HDP bursts).

One sector (e.g. base station) has one HDP transmit opportunity in one HDP cluster. The transmit training position in a HDP cluster can be determined by Hash(CellGroupID+ClusterID)modM.

Figure 4:
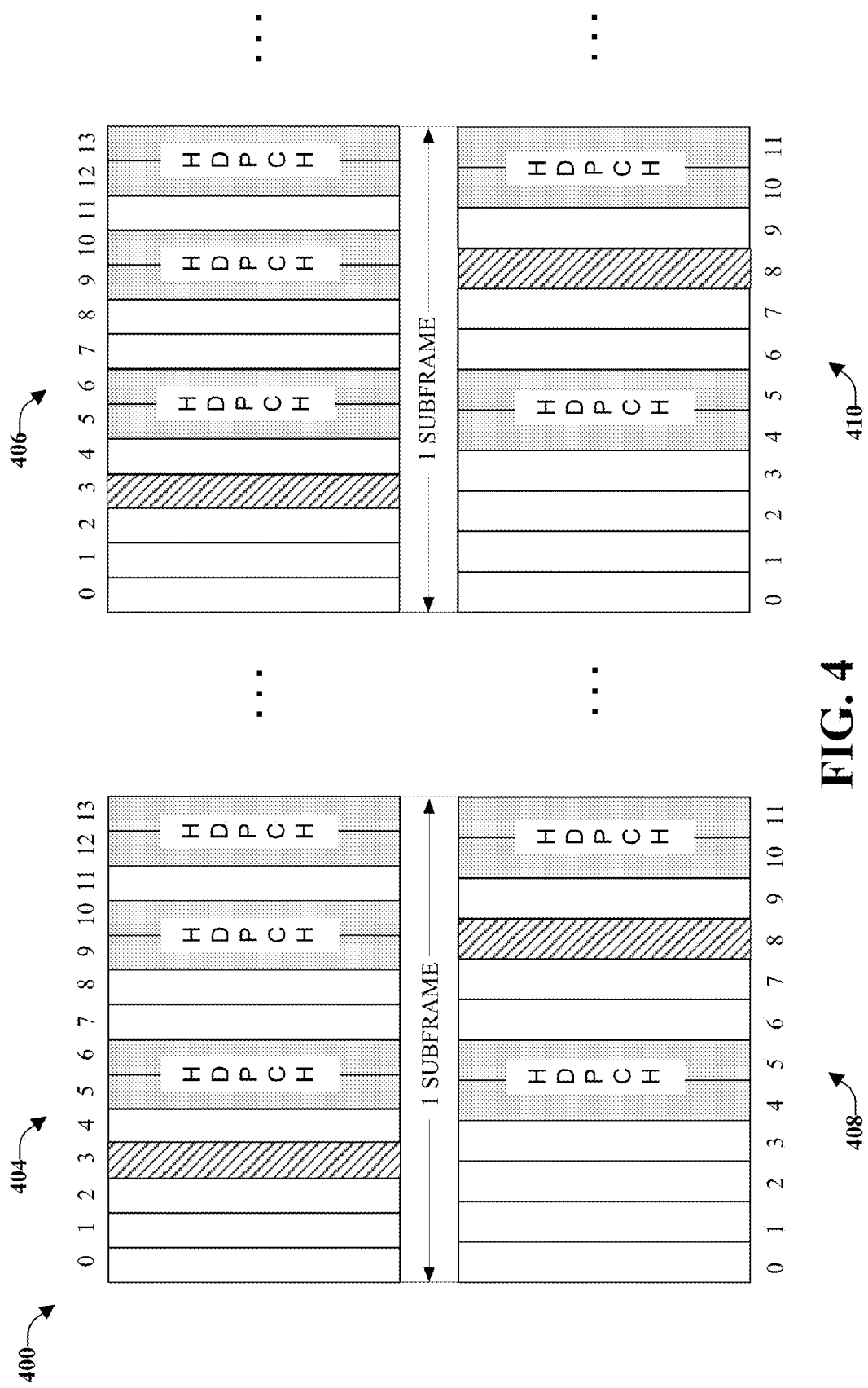
FIG. 4 illustrates another Highly Detectable Pilot structure for an LTE Platform in accordance with an aspect.

With reference now to FIG. 4, illustrated is another HDP structure for an LTE Platform in accordance with an aspect. The HDP structure 300 illustrated above has a relatively short OFDM symbol. If a receiver utilizes an Automatic Gain Control (AGC) to control the input symbol, it can take time for the AGC to converge. For example, the receiver is attempting to detect one of the HDP pilots, such as OFDM Symbol 3, during which a very strong base station (e.g., serving base station) is transmitting its HDP. After transmission, the strong base station shuts off (e.g., on OFDM symbol 4). Thus, the receiver sees a strong signal during symbols 0, 1, 2 and 3 and on OFDM symbol 4, the energy detected by receiver is very small (e.g., strong, serving base station is not transmitting). There is a very large signal and then a drop to very low signal. The AGC at the receiver is attempting to control the input signal to certain level. If the signal drops from 50 dB to 0 dB (for example) it is a sharp change and can take the AGC a long time to converge. Since the OFDM symbol is very short, a portion of the next OFDM symbol will be lost by the time the AGC converges. AGCs with a good response rate can utilize the above HDP structure 300 (which is good because more HDP pilots can be placed in each subframe). However, AGCs that have a slow response rate might be better utilizing the HDP structure 400 illustrated with reference to FIG. 4.

Illustrated at 400 is an HDP Structure for a LTE Frame Type 0 and at 402 is an HDP Structure for a LTE Frame Type 1. Illustrated are two subframes 404, 406 for Frame Type 0, each subframe 404, 406 having fourteen OFDM symbols (labeled 0 through 13). Also illustrated are two subframes 408 and 410 for Frame Type 1 (404), each subframe 408 and 410 includes twelve OFDM symbols (labeled 0 through 11). It should be understood that although only two subframes for each Frame Type 400, 402 are illustrated for purposes of simplicity, a multitude of subframes can be utilized with the disclosed aspects.

Each HDPCH in accordance with this structure utilizes two OFDM symbols. For example, subframes 404 and 406 have three HDPCH opportunities each (M=3/burst). One HDPCH occupies symbols 5 and 6, a second HDPCH occupies symbols 9 and 10; and a third HDPCH can occupy symbols 12 and 13 (symbol 3 is not utilized). Subframes 402 and 410 can include two HDPCH opportunities each (M=2/burst). A first HDPCH can occupy symbols 4 and 5 and a second HDPCH can occupy symbols 10 and 11 (symbol 8 is not utilized).

Combining two OFDM symbols into one HDP opportunity allows an AGC more convergence time. Thus, although it might take the AGC a while to converge (e.g., a portion of an OFDM symbol), there is still the remainder of that OFDM symbol as well as the next (e.g., second) OFDM symbol. Thus, the receiver will still be able to detect the HDP pilot even if the AGC converges very slowly (e.g., an entire OFDM symbol) it still has second portion (e.g., second OFDM symbol) available to detect. Thus, the second HDP structure illustrated at FIG. 4 allows the AGC more time (e.g., more relaxation) to converge.

A tradeoff with the design illustrated in FIG. 4 is that the HDP has expanded two OFDM symbols, so the number of HDPCHs available in each subframe is reduced. For example, in order to provide twenty-one HDP, more subframes are needed to detect all the base stations (e.g., "time to fix" increases).

In accordance with some aspects, a transmitter (and/or receiver) can be configured to utilize either one symbol for HDPCH (shorter time to fix) or two OFDM symbols (takes longer to acquire) to send the pilot.

Figure 5:
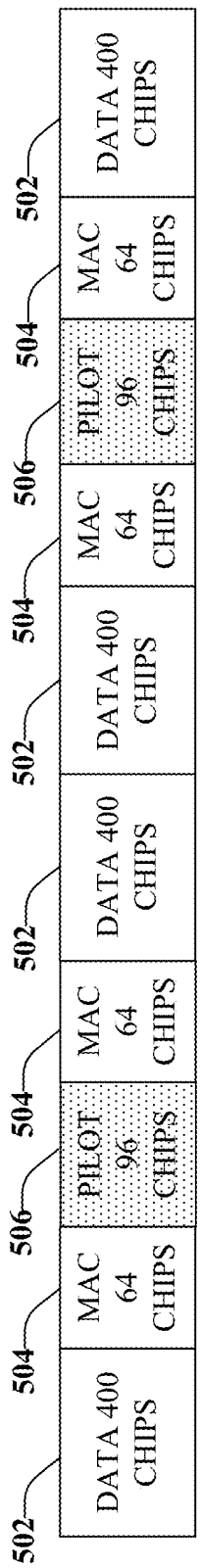
FIG. 5 illustrates an example 1xEV-DO downlink slot structure.

In order to fully appreciate the disclosed aspects, the following will discuss some aspects of CDMA2000® 1x and 1xEV-DO downlink waveforms and FIG. 5 illustrates an example 1xEV-DO downlink slot structure 500. A CDMA2000® downlink carrier is allocated 1.25 MHz of bandwidth. The downlink signal is spread by a PN sequence at the rate of about 1.2288 Mcps with a sector-specific offset, known as the PN offset. The offset PN sequence rolls over about every 32,768 chips (26.66 . . . ms) and aligns with the CDMA system time.

In a 1x downlink, the Pilot Channel is code division multiplexed with the other channels. Thus, the Pilot Channel is transmitted continuously at a fraction of maximum power. While in 1xEV-DO downlink, the Pilot Channel is time division multiplexed with the other channels. Thus, the Pilot Channel is transmitted in a burst at maximum power.

The 1xEV-Do downlink transmission includes time slots of length 2,048 chips (1.66 . . . ms). Groups of sixteen slots (26.66 . . . ms) aligned with the offset PN sequence. Within each slot, the Pilot, MAC, and Traffic or Control Channels are time division multiplexed according to FIG. 5. For example, Data 502 can be 400 Chips, MAC 504 can be 64 Chips, and Pilot 506 can be 96 Chips. The data portion carries either the Traffic or the Control Channel.

Figure 6:
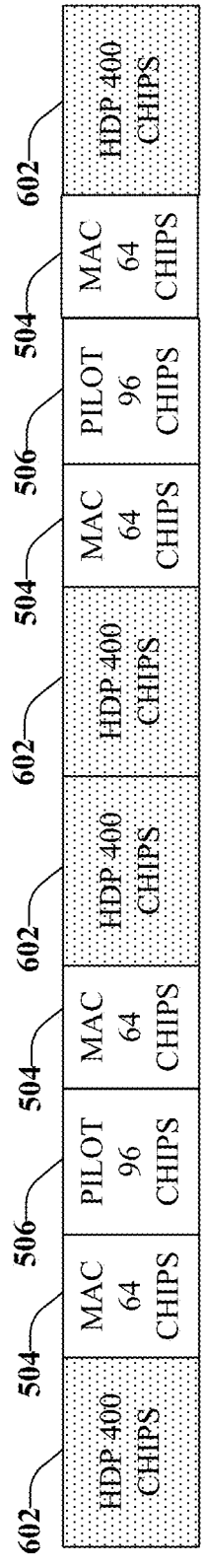
FIG. 6 illustrates an example 1xEV-DO Highly Detectable Pilot Slot Structure, according to an aspect.

FIG. 6 illustrates an example 1xEV-DO HDP Slot Structure 600, according to an aspect. For the 1xEV-DO downlink, certain time slots are allocated and these time slots are referred to as HDP slots 602. The HDP channel is transmitted in the data portion of these dedicated slots. The legacy Pilot and MAC channels are retained for backward comparability. HDP appears as unintended packets for legacy mobile devices that cannot recognize the HDP. A HDP slot has a low duty cycle around 1%, thus a HDP slot has minimal impact on downlink capacity.

Both the dedicated slots and the sectors are partitioned in K groups and a one-to-one association between the partitions is defined. Each group of sectors can only transmit HDP in its associated slots. This is referred to as reuse over time with a factor K (sometimes also referred to as factor 1/K).

Partitioning of the sectors is referred to as "coloring." Each cell and sector is associated with a color. The color of a cell takes on a value from the set, such as {Red, Green, Blue}, abbreviated as {R, G, B}, the color of a sector takes on a value from the set {R, G, B}×{α, β, γ}, where "x" stands for Cartesian product. The color of a sector is a 2-tuple, for example (R,α) abbreviated as Rα, the first element coming from the color of the cell to which the sector belongs. As a result, the reuse factor K=9 is utilized for HDP transmission.

Figure 7:
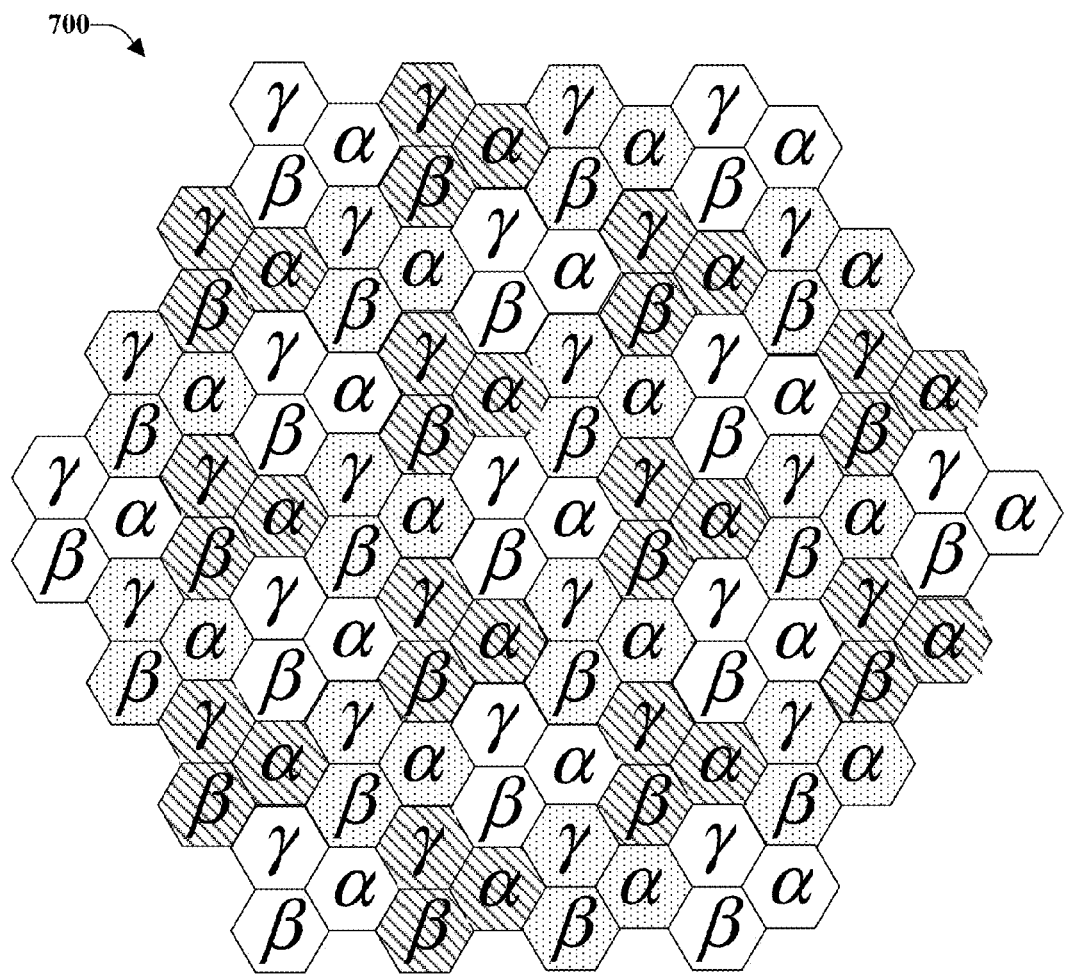
FIG. 7 illustrates an example of planned coloring, in accordance with an aspect.

FIG. 7 illustrates an example of planned coloring 700, in accordance with an aspect. In planned coloring, colors are assigned in a fixed manner in order to minimize the interference among the sectors of the same color in a balanced manner. In the figure, colors are indicated by the different types of shading of the cells.

Figure 8:
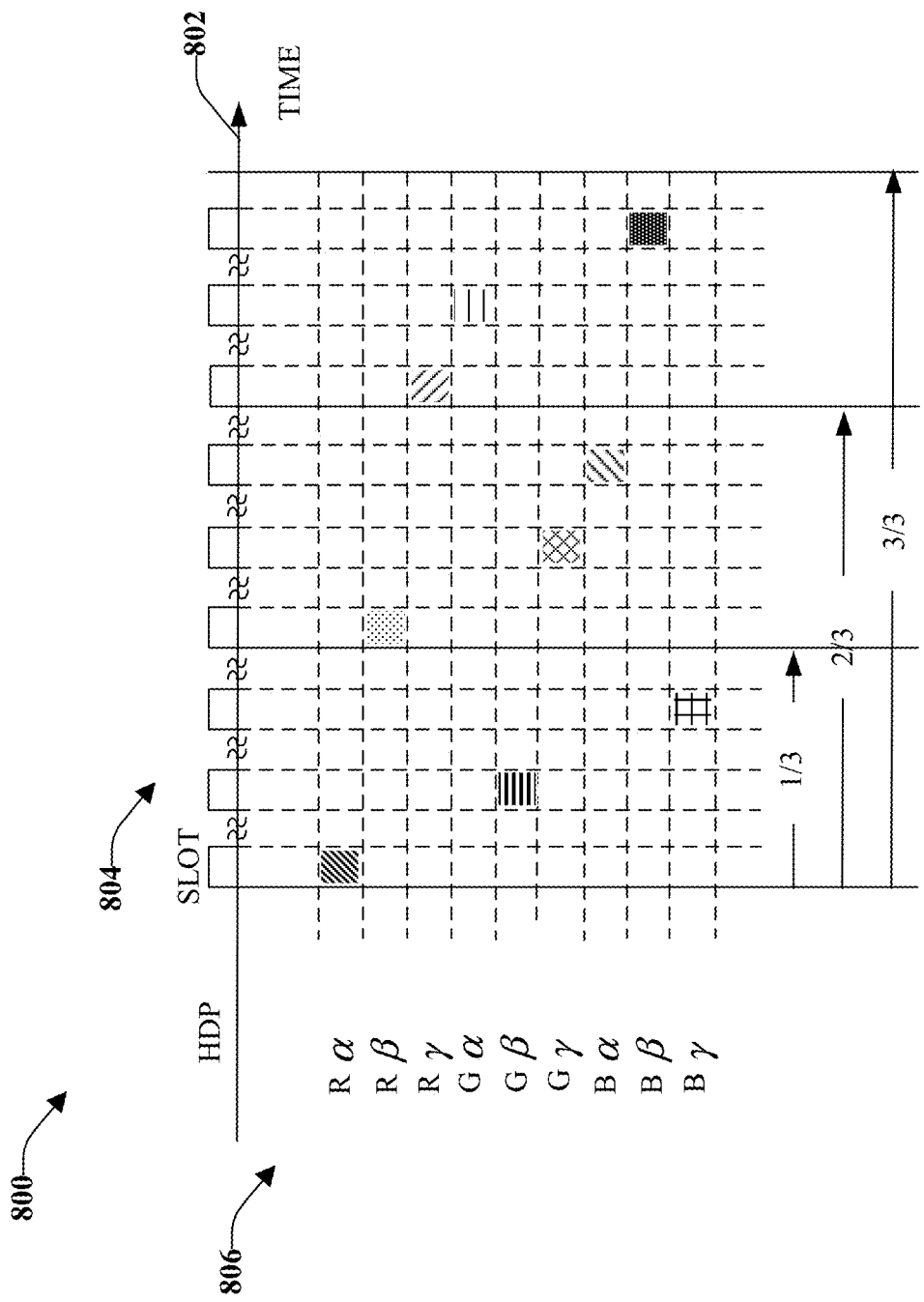
FIG. 8 illustrates an example 1xEV-DO Highly Detectable Pilot transmit timing.

The color of a sector uniquely determines an HDP slot transmit timing for the sector. FIG. 8 illustrates an example 1xEV-DO HDP transmit timing, wherein time is represented along the horizontal axis. In this figure, HDP slots 804 and the transmission order of the sector groups 806 is illustrated. Further information related to transmission timing, such as the period and offsets, will be described in further detail below.

Dedicated resource and reuse can mitigate other channel interference and can also mitigate co-channel interference. Thus, dedicated resource and reuse can mitigate the near-far effect and can improve hearability.

Based on one HDP slot 804, mobile device has an opportunity to detect sectors in one of the nine groups. Mobile devices does not have to wait for receiving nine HDP slots before computing a location estimated. Thus, mobile device can tradeoff delay with hearability autonomously. As illustrated in FIG. 8, mobile device can perform position fix after receiving ⅓, ⅔, or all of the nine HDP slots. Longer delay corresponds to more detected base stations, thus the term incremental detection.

For incremental detection to provide a smooth tradeoff between location accuracy and delay, mobile device should be able to detect an adequate number of base stations from all directions at an earlier time, which is provided for by the transmission order illustrated in FIG. 8. This can be better understood by two counter examples in the following. One possible transmission order is: Rα, Rβ, Rγ, Gα, Gβ, Gγ, Bα, Bβ, Bγ. A mobile device located in a Ra sector cannot detect an adequate number of base stations in the first one third of the period due to near-far effect.

Another possible transmission order is: Rα, Gα, Bα, Rβ, Gβ, Bβ, Rγ, Gγ, Bγ. A mobile device cannot detect base stations from all directions in the each one third of the period because all a sectors have directional antenna beams in the same orientation as show in FIG. 8. Further, the β and γ sectors respectively have directional antenna beams in a same orientation.

Communication systems can have irregular cells, which are different from the orientation of FIG. 8. Planned coloring requires operators' efforts in the color assignment to minimize interference among sectors of the same color in a balanced manner Random coloring eliminates the planning effort and can comply with incremental detection.

In random coloring, the color of a sector varies with time in a random manner For each period of nine HDP slots, a cell generates a random integer between 0 and 8, which is then mapped into a color. Sectors within the cell are numbered 0, 1, 2, . . . , and the color determined above is assigned to sector 0. The other sectors within the cell are colored in such a manner that the second elements of colors for sector 0, 1, 2, . . . follow the sequential order of α, β, γ with wrap around. For example, if sector 0 has as the second elements of its color, then sector 1 has γ as the second element of its color and sector 2 has a as the second element of its color.

Random coloring can provide the statistical K=9 reuse, advantageous over the static K=9 reuse provided by planned coloring. In random coloring, any color group has ⅑ of the total sectors in the average sense. However, for a given realization of the random color assignment, the group can have more of less than ⅑ of the sectors. This can allow weak pilots to be detected over time, which can be beneficial to the positioning of static mobile device.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 9:
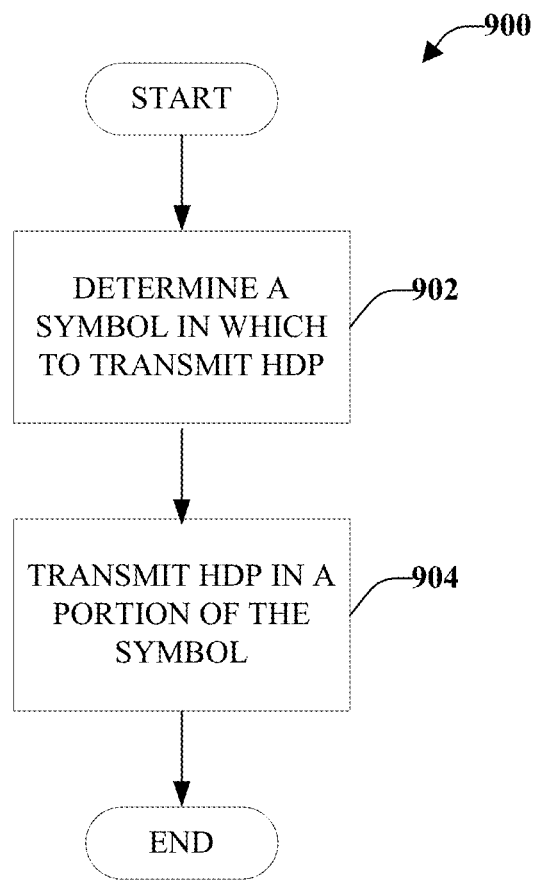
FIG. 9 illustrates a method for providing highly detectable pilots in a communication environment, according to an aspect.

FIG. 9 illustrates a method 900 for providing highly detectable pilots in a communication environment, according to an aspect. According to various aspects, a processor executing computer executable instructions stored on a computer readable storage medium can be employed to implement method 900.

Method 900 starts at, 902, with a determination of at least one symbol during which a highly detectable pilot can be transmitted. The at least one symbol can be at least one data symbol. In accordance with some aspects, the at least one symbol is an OFDM symbol. Determining the at least one symbol, at 902, can be a function of a cell group identification. In accordance with some aspects, the determination is based on receiving an instruction from the communication network to use the at least one symbol.

At 904, a highly detectable pilot is transmitted in a portion of the at least one symbol. During other portions of the at least one symbol (or during other symbols) the highly detectable pilot is not transmitted (e.g., a period of silence is observed).

In accordance with some aspects, method 900 includes forming a combination of the at least one symbol and a second symbol and transmitting the highly detectable pilot in the portion of the combination.

In accordance with some aspects, a computer program product can include a computer-readable medium that comprises codes for carrying out various aspects of method 900. Computer-readable medium can include a first set of codes for causing a computer to select a position in at least one data symbol. The at least one data symbol is scheduled as a highly detectable pilot opportunity. Computer-readable medium can include a second set of codes for causing the computer to transmit a highly detectable pilot in the position and to not transmit during other positions of the at least one data symbol. In accordance with some aspects, computer-readable medium includes a third set of codes for causing the computer to combine the at least one data symbol with a second data symbol.

According to some aspects, the dedicated resource for HDP can be in different forms, such as time segments, frequency bands, or time-frequency bins. As discussed herein, the dedicated time-frequency resources can be partitioned into K groups. The partition can be performed based on any orthogonal basis that spans the full dimension. Then the sectors can be partitioned into K groups and a one-to-one association between the partitions of resources and sectors can be defined. Each group of sectors can transmit HDP in its associated fraction of resource (not at other times). Incremental detection refers to the situation when mobile device performs base station detection and positioning based on HDP transmission of less than K groups. Random coloring can be applied. However, in accordance with some aspects, certain conditions can be included to confine the scope of randomness. Thus, HDP can be extended to OFDM system, such as LTE and UMP, 4G, and other system.

Figure 10:
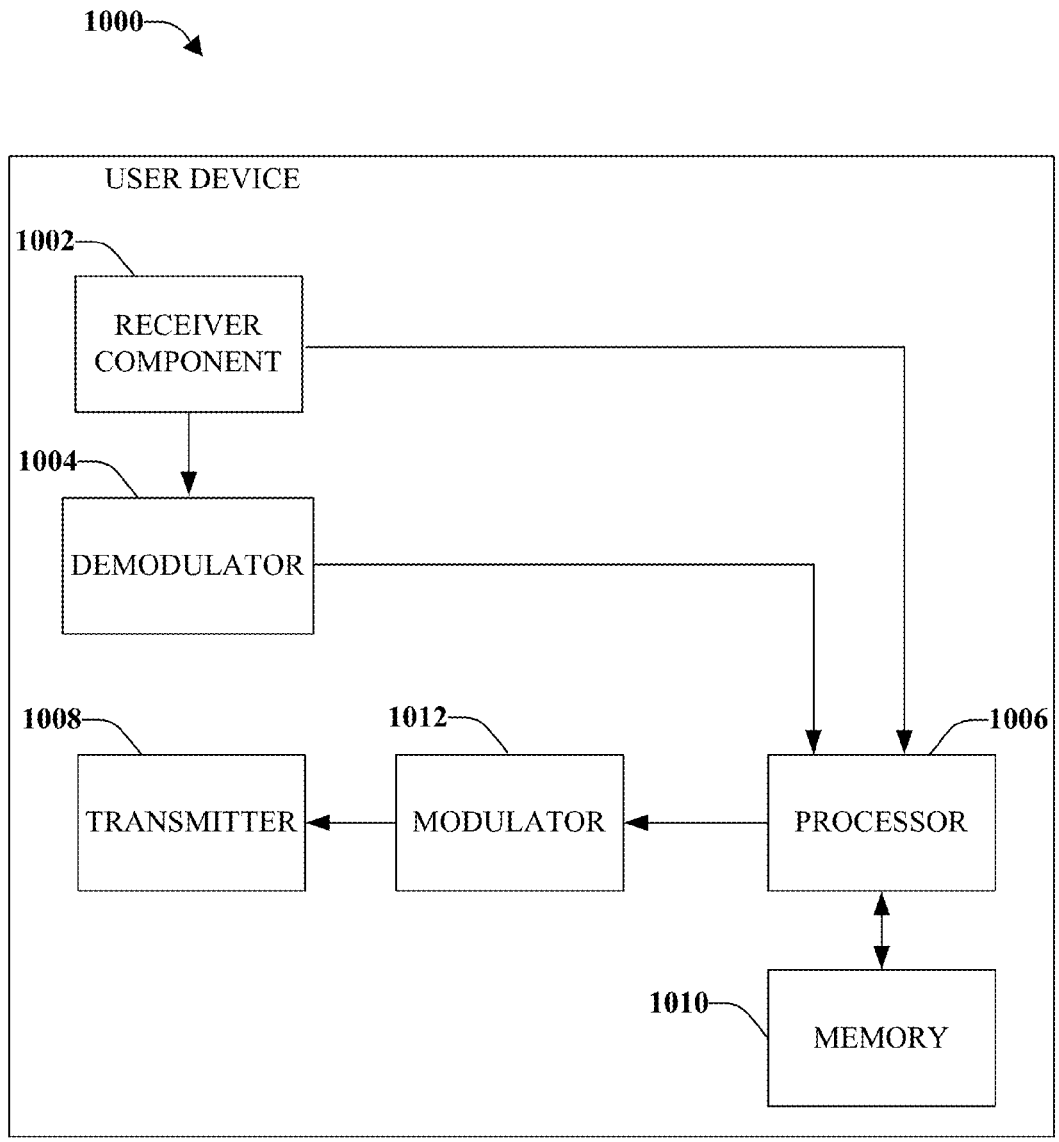
FIG. 10 illustrates a system that facilitates reception of highly detectable pilots in accordance with one or more of the disclosed aspects.

With reference now to FIG. 10, illustrated is a system 1000 that facilitates reception of highly detectable pilots in accordance with one or more of the disclosed aspects. System 1000 can reside in a user device. System 1000 comprises a receiver component 1002 that can receive a signal from, for example, a receiver antenna. Receiver component 1002 can perform typical actions thereon, such as filtering, amplifying, down-converting, etc. the received signal. Receiver component 1002 can also digitize the conditioned signal to obtain samples. A demodulator 1004 can obtain received symbols for each symbol period, as well as provide received symbols to a processor 1006.

Processor 1006 can be a processor dedicated to analyzing information received by receiver component 1002 and/or generating information for transmission by a transmitter 1008. In addition or alternatively, processor 1006 can control one or more components of system 1000, analyze information received by receiver component 1002, generate information for transmission by transmitter 1008, and/or control one or more components of system 1000. Processor 1006 may include a controller component capable of coordinating communications with additional user devices.

System 1000 can additionally comprise memory 1010 operatively coupled to processor 1006. Memory 1010 can store information related to coordinating communications and any other suitable information. Memory 1010 can additionally store protocols associated with highly detectable pilots System 1000 can further comprise a symbol modulator 1012, wherein transmitter 1008 transmits the modulated signal.

Figure 11:
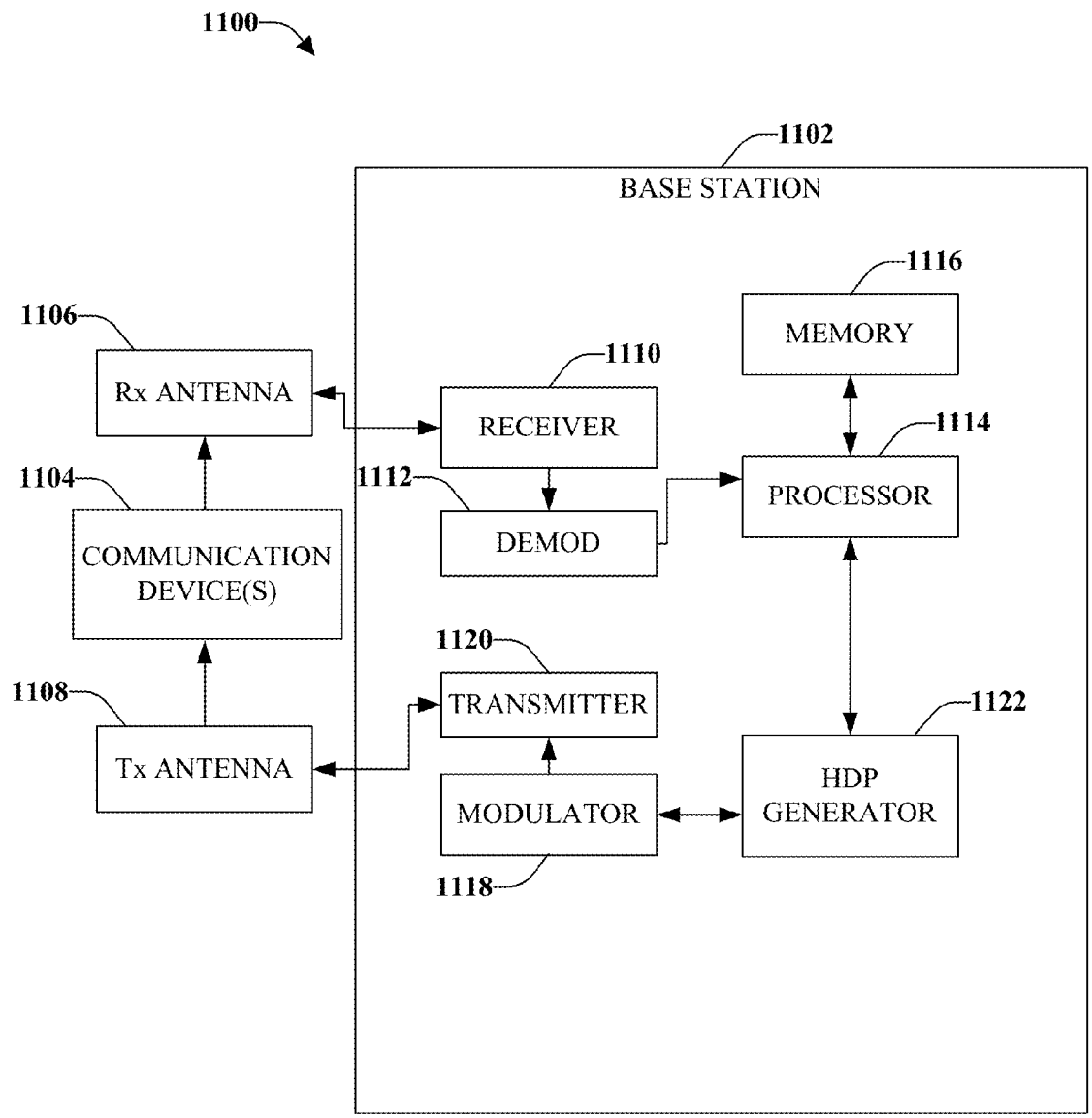
FIG. 11 illustrates a system that facilitates transmission of highly detectable pilots in accordance with various aspects presented herein.

FIG. 11 is an illustration of a system 1100 that facilitates transmission of highly detectable pilots in accordance with various aspects presented herein. System 1100 comprises a base station or access point 1102. As illustrated, base station 1102 receives signal(s) from one or more communication devices 1104 (e.g., user device) by a receive antenna 1106, and transmits to the one or more communication devices 1104 through a transmit antenna 1108.

Base station 1102 comprises a receiver 1110 that receives information from receive antenna 1106 and is operatively associated with a demodulator 1112 that demodulates received information. Demodulated symbols are analyzed by a processor 1114 that is coupled to a memory 1116 that stores information related to conveying highly detectable pilots in a communication environment. A modulator 1118 can multiplex the signal for transmission by a transmitter 1120 through transmit antenna 1108 to communication devices 1104.

Processor 1114 is further coupled to a highly detectable pilot generator 1122 that is configured to provide at least one OFDM symbol as an HDP opportunity and determine a transmit position in an HDP cluster as a function of the HDP opportunity. The HDP opportunity can be one OFDM symbol and the transmit position in an HDP Cluster can be determined by the equation: HDP Cluster=Hash(CellGroupID+ClusterID)mod M. In accordance with some aspects, the HDP opportunity is two OFDM symbols to provide an AGC (or a receiver) more convergence time. Each sector can have one HDP transmit opportunity in one HDP cluster.

Figure 12:
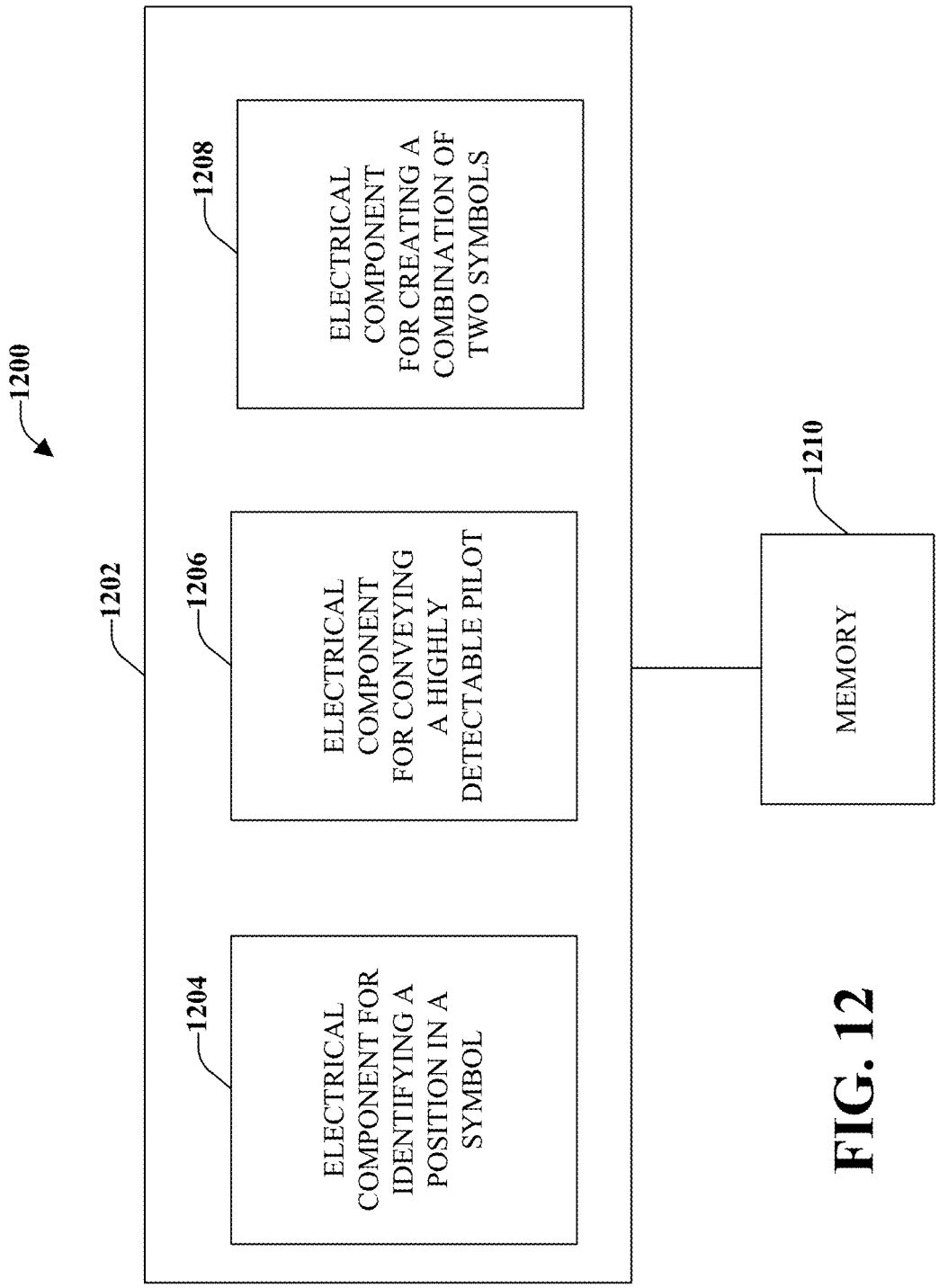
FIG. 12 illustrates an example system that conveys highly detectable pilots that can be utilized for mobile device positioning, according to an aspect.

With reference to FIG. 12, illustrated is an example system 1200 that conveys highly detectable pilots that can be utilized for mobile device positioning, according to an aspect. System 1200 can reside at least partially within a transmitter or base station. It is to be appreciated that system 1200 is represented as including functional blocks, which may be functional blocks that represent functions implemented by a processor, software, or combination thereof (e.g., firmware).

System 1200 includes a logical grouping 1202 of electrical components that can act separately or in conjunction. Logical grouping 1202 includes an electrical component 1204 for identifying a position of the at least one data symbol for transmission of the highly detectable pilot. In accordance with some aspects, electrical component 1204 obtains information from the communication network, wherein the information is related to a plurality of positions in the at least one data symbol and other data symbols and chooses one of the plurality of positions. According to some aspects, electrical component 1204 identifies the position as a function of a cell group identification. In accordance with some aspects, electrical component 1204 identifies the position of a function of the equation: HDP Cluster=Hash(CellGroupID+ClusterID) mod M.

Also included in logical grouping 1202 is an electrical component 1206 for conveying the highly detectable pilot in the position of the at least one data symbol, wherein the highly detectable pilot is conveyed to one or more receivers for a position determination. Electrical component 1206 does not transmit the highly detectable pilot in other positions of the at least one data symbol or in other data symbols, which provides a receiver an opportunity to detect pilots from other transmitters (e.g., base stations).

In accordance with some aspects, logical grouping 1202 includes an electrical component 1208 for creating a combination of the at least one symbol and a second symbol, the means for conveying the highly detectable pilot sends the highly detectable pilot in a portion of the combination.

Additionally, system 1200 can include a memory 1210 that retains instructions for executing functions associated with electrical components 1204, 1206, and 1208 or other components. While shown as being external to memory 1210, it is to be understood that one or more of electrical components 1204, 1206, and 1208 may exist within memory 1210.

Figure 13:
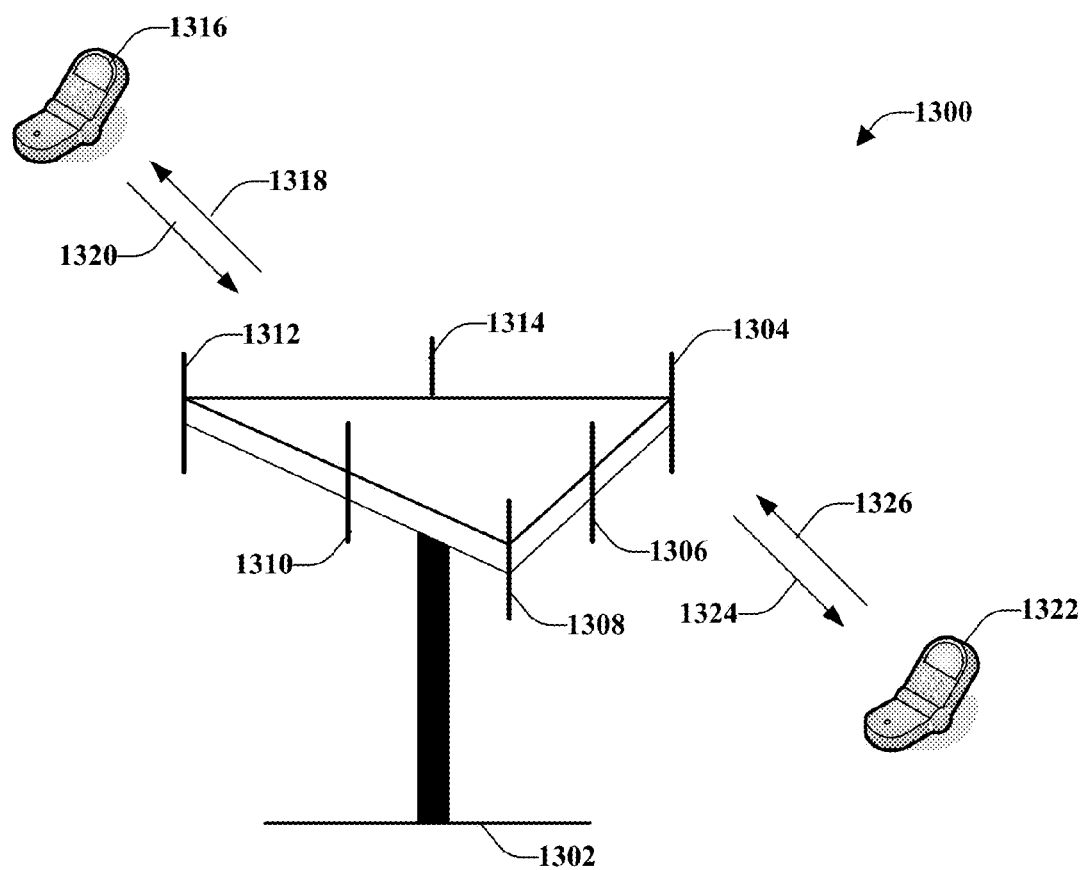
FIG. 13 illustrates a multiple access wireless communication system according to one or more aspects.

Referring now to FIG. 13 a multiple access wireless communication system 1300 according to one or more aspects is illustrated. A wireless communication system 1300 can include one or more base stations in contact with one or more user devices. Each base station provides coverage for a plurality of sectors. A three-sector base station 1302 is illustrated that includes multiple antenna groups, one including antennas 1304 and 1306, another including antennas 1308 and 1310, and a third including antennas 1312 and 1314. According to the figure, only two antennas are shown for each antenna group, however, more or fewer antennas may be utilized for each antenna group. Mobile device 1316 is in communication with antennas 1312 and 1314, where antennas 1312 and 1314 transmit information to mobile device 1316 over forward link 1318 and receive information from mobile device 1316 over reverse link 1320. Forward link (or downlink) refers to communication link from base stations to mobile devices, and reverse link (or uplink) refers to communication link from mobile devices to base stations. Mobile device 1322 is in communication with antennas 1304 and 1306, where antennas 1304 and 1306 transmit information to mobile device 1322 over forward link 1324 and receive information from mobile device 1322 over reverse link 1326. In a FDD system, for example, communication links 1318, 1320, 1324, and 1326 might utilize different frequencies for communication. For example, forward link 1318 might use a different frequency than the frequency utilized by reverse link 1320.

Each group of antennas and/or the area in which they are designated to communicate may be referred to as a sector of base station 1302. In one or more aspects, antenna groups each are designed to communicate to mobile devices in a sector or the areas covered by base station 1302. A base station may be a fixed station used for communicating with mobile devices.

In communication over forward links 1318 and 1324, transmitting antennas of base station 1302 can utilize beamforming in order to improve a signal-to-noise ratio of forward links for different mobile devices 1316 and 1322. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 14:
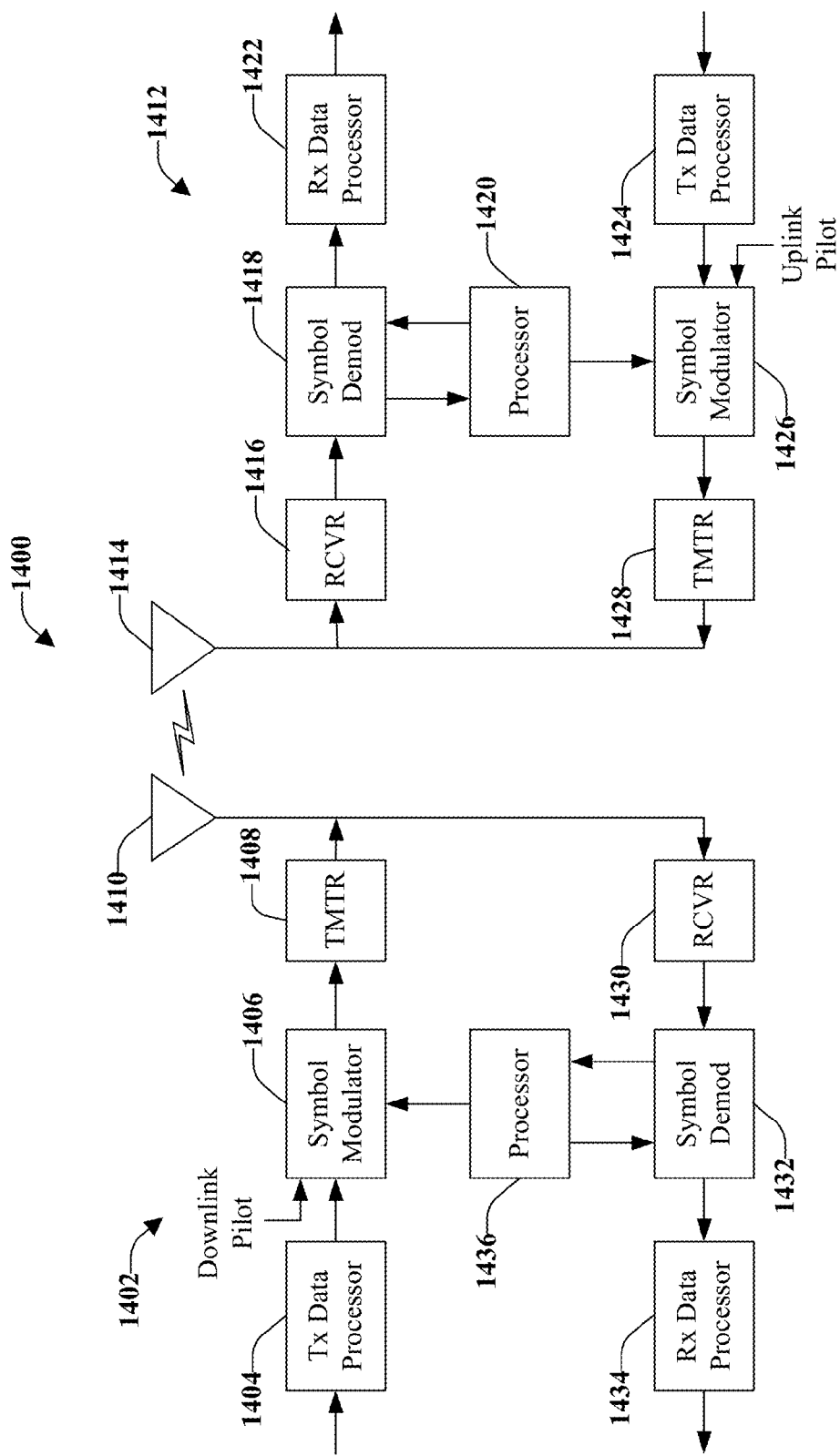
FIG. 14 illustrates an exemplary wireless communication system, according to various aspects.

FIG. 14 illustrates an exemplary wireless communication system 1400, according to various aspects. Wireless communication system 1400 depicts one base station and one terminal for sake of brevity. However, it is to be appreciated that system 1400 can include more than one base station or access point and/or more than one terminal or user device, wherein additional base stations and/or terminals can be substantially similar or different from the exemplary base station and terminal described below. In addition, it is to be appreciated that base station and/or terminal can employ various aspects described herein to facilitate wireless communication there between.

On a downlink, at access point 1402, a transmit (TX) data processor 1404 receives, formats, codes, interleaves, and modulates (or symbol maps) traffic data and provides modulation symbols ("data symbols"). A symbol modulator 1406 receives and processes data symbols and pilot symbols and provides a stream of symbols. Symbol modulator 1406 multiplexes data and pilot symbols and obtains a set of N transmit symbols. Each transmit symbol may be a data symbol, a pilot symbol, or a signal value of zero. Pilot symbols may be sent continuously in each symbol period. Pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1408 receives and converts the stream of symbols into one or more analog signals and further conditions (e.g., amplifies, filters, frequency upconverts, and so on) analog signals to generate a downlink signal suitable for transmission over wireless channel. Downlink signal is then transmitted through an antenna 1410 to terminals. At terminal 1412, an antenna 1414 receives downlink signal and provides a received signal to a receiver unit (RCVR) 1416. Receiver unit 1416 conditions (e.g., filters, amplifies, frequency downconverts, and so forth) received signal and digitizes conditioned signal to obtain samples. A symbol demodulator 1418 obtains N received symbols and provides received pilot symbols to a processor 1420 for channel estimation. Symbol demodulator 1418 further receives a frequency response estimate for the downlink from processor 1420, performs data demodulation on received data symbols to obtain data symbol estimates (which are estimates of transmitted data symbols). Further, symbol demodulator 1418 provides data symbol estimates to a RX data processor 1422, which demodulates (e.g., symbol demaps), deinterleaves, and decodes data symbol estimates to recover transmitted traffic data. Processing by symbol demodulator 1418 and RX data processor 1422 is complementary to processing by symbol modulator 1406 and TX data processor 1404, respectively, at access point 1402.

On the uplink, a TX data processor 1424 processes traffic data and provides data symbols. A symbol modulator 1426 receives and multiplexes data symbols with pilot symbols, performs modulation, and provides a stream of symbols. A transmitter unit 1428 receives and processes the stream of symbols to generate an uplink signal, which is transmitted by antenna 1414 to access point 1402.

At access point 1402, uplink signal from terminal 1412 is received by antenna 1410 and processed by a receiver unit 1430 to obtain samples. A symbol demodulator 1432 then processes the samples and provides received pilot symbols and data symbol estimates for uplink. A RX data processor 1434 processes data symbol estimates to recover traffic data transmitted by terminal 1412. A processor 1436 performs channel estimation for each active terminal transmitting on uplink.

Processors 1436 and 1420 direct (e.g., control, coordinate, manage, and so forth) operation at access point 1402 and terminal 1412, respectively. Respective processors 1436 and 1420 can be associated with memory units (not shown) that store program codes and data. Processors 1436 and 1420 can also perform computations to derive frequency and impulse response estimates for uplink and downlink, respectively.

For a multiple-access system (e.g., FDMA, OFDMA, CDMA, TDMA, and the like), multiple terminals can transmit concurrently on uplink. For such a system, pilot subbands may be shared among different terminals. Channel estimation techniques may be used in cases where pilot subbands for each terminal span the entire operating band (possibly except for band edges). Such a pilot subband structure would be desirable to obtain frequency diversity for each terminal. The techniques described herein may be implemented by various means. For example, these techniques may be implemented in hardware, software, or a combination thereof. For a hardware implementation, processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform functions described herein, or a combination thereof. With software, implementation can be through modules (e.g., procedures, functions, and so on) that perform functions described herein. Software codes may be stored in memory unit and executed by processors 1436 and 1420.

It is to be understood that aspects described herein may be implemented by hardware, software, firmware or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method that conveys a highly detectable pilot in a wireless communication network, comprising:
   identifying a position of at least one data symbol for transmission of the highly detectable pilot; and
   conveying the highly detectable pilot in the position of the at least one data symbol, wherein the highly detectable pilot is conveyed to one or more receivers for a determination of the position, and wherein a low reuse factor is utilized for transmission of the highly detectable pilot.

2. The method of claim 1, further comprising:
   deciding not to transmit the highly detectable pilot in other positions of the at least one data symbol or in other data symbols.

3. The method of claim 1, wherein identifying the position of the at least one data symbol for transmission of the highly detectable pilot comprises:
   obtaining information from the communication network related to a plurality of positions in the at least one data symbol and other data symbols; and
   choosing one of the plurality of positions.

4. The method of claim 1, wherein identifying the position of the at least one data symbol for transmission of the highly detectable pilot is as a function of a cell group identification.

5. The method of claim 1, further comprising:
   creating a combination of the at least one symbol and a second symbol; and
   conveying the highly detectable pilot in a portion of the combination.

6. The method of claim 1, further comprising:
   determining the position of the at least one data symbol as a function of identification of one or more cells.

7. An apparatus that conveys a highly detectable pilot in a wireless communication network, comprising:
   at least one processor configured to:
      identify a position of at least one data symbol for transmission of the highly detectable pilot; and
      convey the highly detectable pilot in the position of the at least one data symbol, wherein the highly detectable pilot is conveyed to one or more receivers for a determination of the position, and wherein a low reuse factor is utilized for transmission of the highly detectable pilot; and
   a memory coupled to the at least one processor.

8. The apparatus of claim 7, wherein the at least one processor is further configured to:
   decide not to transmit the highly detectable pilot in other positions of the at least one data symbol or in other data symbols.

9. The apparatus of claim 7, wherein the at least one processor is configured to identify the position of the at least one data symbol for transmission of the highly detectable pilot by:
   obtaining information from the communication network related to a plurality of positions in the at least one data symbol and other data symbols; and
   choosing one of the plurality of positions.

10. The apparatus of claim 7, wherein the at least one processor is configured to identify the position of the at least one data symbol for transmission of the highly detectable pilot as a function of a cell group identification.

11. The apparatus of claim 7, wherein the at least one processor is further configured to:
    create a combination of the at least one symbol and a second symbol; and
    convey the highly detectable pilot in a portion of the combination.

12. The apparatus of claim 7, wherein the at least one processor is further configured to:
    determining the position of the at least one data symbol as a function of identification of one or more cells.

13. An apparatus that conveys a highly detectable pilot in a wireless communication network, comprising:
    means for identifying a position of at least one data symbol for transmission of the highly detectable pilot; and
    means for conveying the highly detectable pilot in the position of the at least one data symbol, wherein the highly detectable pilot is conveyed to one or more receivers for a determination of the position and wherein a low reuse factor is utilized for transmission of the highly detectable pilot.

14. The apparatus of claim 13, wherein the means for conveying the highly detectable pilot does not transmit the highly detectable pilot in other positions of the at least one data symbol or in other data symbols.

15. The apparatus of claim 13, wherein the means for identifying the position of the at least one data symbol for transmission of the highly detectable pilot obtains information from the communication network related to a plurality of positions in the at least one data symbol and other data symbols and chooses one of the plurality of positions.

16. The apparatus of claim 13, wherein the means for identifying the position of the at least one data symbol for transmission of the highly detectable pilot identifies the position as a function of a cell group identification.

17. The apparatus of claim 13, further comprises means for creating a combination of the at least one symbol and a second symbol, the means for conveying the highly detectable pilot sends the highly detectable pilot in a portion of the combination.

18. The apparatus of claim 13, further comprising:
    means for determining the position of the at least one data symbol as a function of identification of one or more cells.

19. A computer readable medium for conveying a highly detectable pilot in a wireless communication network, comprising:
    code for identifying a position of at least one data symbol for transmission of the highly detectable pilot; and
    code for conveying the highly detectable pilot in the position of the at least one data symbol, wherein the highly detectable pilot is conveyed to one or more receivers for a determination of the position, and wherein a low reuse factor is utilized for transmission of the highly detectable pilot.

20. The computer readable medium of claim 19, further comprising:
code for deciding not to transmit the highly detectable pilot in other positions of the at least one data symbol or in other data symbols.

21. The computer readable medium of claim 19, wherein the code for identifying the position of the at least one data symbol for transmission of the highly detectable pilot comprises:
code for obtaining information from the communication network related to a plurality of positions in the at least one data symbol and other data symbols; and
code for choosing one of the plurality of positions.

22. The computer readable medium of claim 19, wherein the code for identifying the position of the at least one data symbol for transmission of the highly detectable pilot comprises code for identifying as a function of a cell group identification.

23. The computer readable medium of claim 19, further comprising:
code for creating a combination of the at least one symbol and a second symbol; and
code for conveying the highly detectable pilot in a portion of the combination.

24. The computer readable medium of claim 19, further comprising:
code for determining the position of the at least one data symbol as a function of identification of one or more cells.

25. A method for receiving a highly detectable pilot in a wireless communication network, comprising:
receiving symbols from one or more transmitters; and
determining a position of at least one data symbol in which the highly detectable pilot was transmitted, wherein a low reuse factor was utilized for transmission of the highly detectable pilot.

26. The method of claim 25, wherein the determining the position of the at least one data symbol in which a highly detectable pilot was transmitted is as a function of a cell group identification.

27. The method of claim 25, further comprising:
receiving the highly detectable pilot in a portion of a combination of two symbols, the combination comprising the at least one data symbol and a second symbol.

28. The method of claim 25, further comprising:
determining the position of the at least one data symbol as a function of identification of one or more cells.

29. An apparatus for receiving a highly detectable pilot in a wireless communication network, comprising:
at least one processor configured to:
receive symbols from one or more transmitters; and
determine a position of at least one data symbol in which a highly detectable pilot was transmitted, wherein a low reuse factor was utilized for transmission of the highly detectable pilot; and
a memory coupled to the at least one processor.

30. The apparatus of claim 29, wherein the at least one processor is configured to determine the position of the at least one data symbol in which a highly detectable pilot was transmitted as a function of a cell group identification.

31. The apparatus of claim 29, wherein the at least one processor is further configured to:
receive the highly detectable pilot in a portion of a combination of two symbols, the combination comprising the at least one data symbol and a second symbol.

32. The apparatus of claim 29, wherein the at least one processor is further configured to:
determine the position of the at least one data symbol as a function of identification of one or more cells.

33. An apparatus for receiving a highly detectable pilot in a wireless communication network, comprising:
means for receiving symbols from one or more transmitters; and
means for determining a position of the at least one data symbol in which a highly detectable pilot was transmitted, wherein a low reuse factor was utilized for transmission of the highly detectable pilot.

34. The apparatus of claim 33, wherein the means for determining the position of the at least one data symbol in which a highly detectable pilot was transmitted is configured to make the determination as a function of a cell group identification.

35. The apparatus of claim 33, further comprising:
means for receiving the highly detectable pilot in a portion of a combination of two symbols, the combination comprising the at least one data symbol and a second symbol.

36. The apparatus of claim 33, further comprising:
means for determining the position of the at least one data symbol as a function of identification of one or more cells.

37. A computer-readable medium for receiving a highly detectable pilot in a wireless communication network, comprising:
code for receiving symbols from one or more transmitters; and
code for determining a position of the at least one data symbol in which a highly detectable pilot was transmitted, wherein a low reuse factor was utilized for transmission of the highly detectable pilot.

38. The computer-readable medium of claim 37, wherein the code for determining the position of the at least one data symbol in which a highly detectable pilot was transmitted comprises code for making the determination as a function of a cell group identification.

39. The computer-readable medium of claim 37, further comprising:
code for receiving the highly detectable pilot in a portion of a combination of two symbols, the combination comprising the at least one data symbol and a second symbol.

40. The computer-readable medium of claim 37, further comprising:
code for determining the position of the at least one data symbol as a function of identification of one or more cells.

* * * * *